Aug. 9, 1966     A. GOLOFF     3,265,052
VALVE GUIDES
Filed July 27, 1964
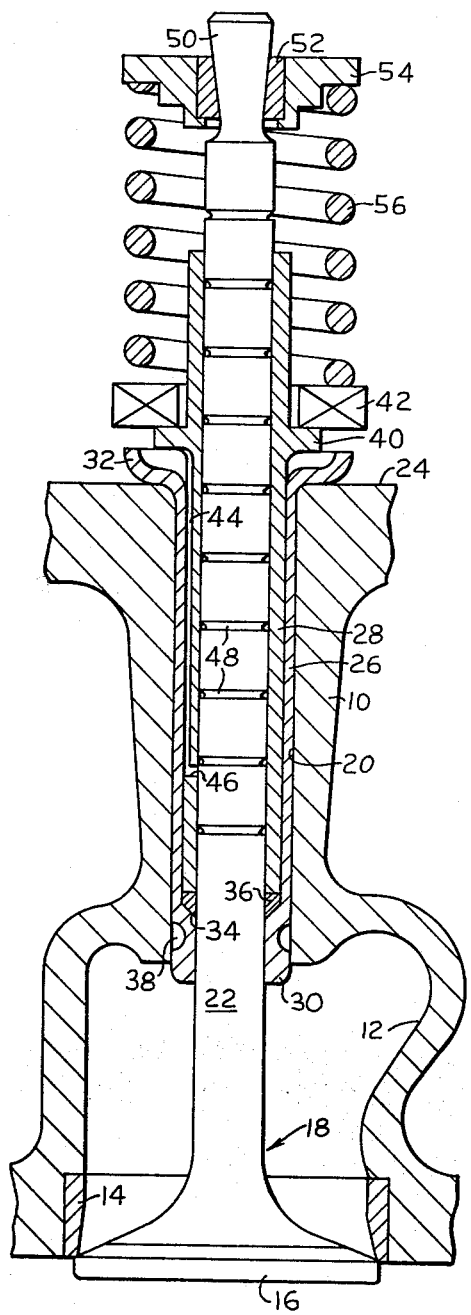
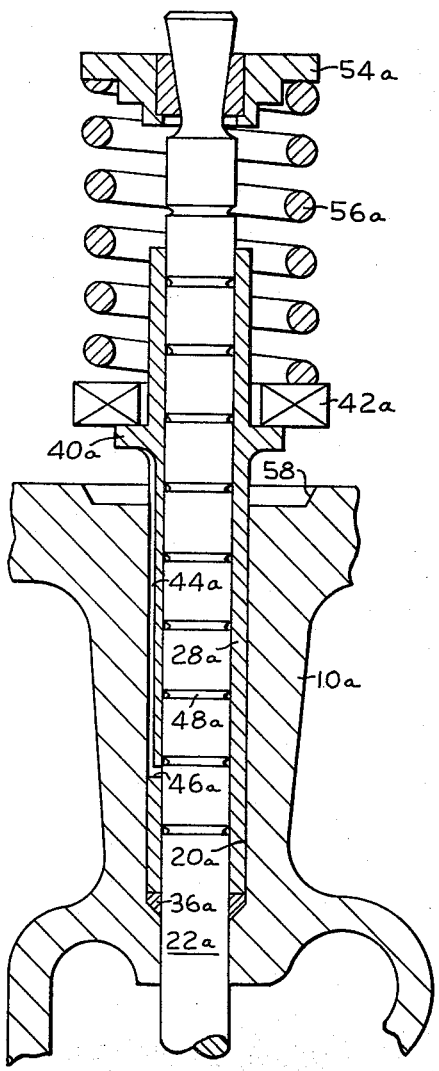
INVENTOR.
ALEXANDER GOLOFF
BY
*Fryer and Zimwold*
ATTORNEYS

United States Patent Office 3,265,052
Patented August 9, 1966

3,265,052
VALVE GUIDES
Alexander Goloff, East Peoria, Ill., assignor to Caterpillar Tractor Co., Peoria, Ill., a corporation of California
Filed July 27, 1964, Ser. No. 385,124
10 Claims. (Cl. 123—188)

This invention relates to valve guides for internal combustion engines and more particularly to valve guides being arranged to distribute lubricant substantially throughout the entire length of the valve stem and incorporating a seal for preventing the entrance of exhaust gases in the valve guide.

The basic concept of this invention provides a solution to the problem of sticking valves particularly exhaust valves. This problem has become more acute with the advent of high performance internal combustion engines which have relatively high exhaust gas pressures and temperatures. Lubricant distributed to the valve stems is carbonized on the surface thereof, thereby reducing the running clearance and effectively blocking the entrance of lubricating oil. Such deposits increase in thickness until the valve stem binds in an open position. Such a condition obviously renders the stroke of the piston ineffective to transfer the work of expansion to the crankshaft and causes the valve to burn.

Examples of prior art structures relating to the problem of lubricating valves is the subject of U.S. Patents 2,069,745 and 2,722,925. The first patent discloses the concept of utilizing a lubricating pump operated by the camshaft for supplying lubricant under pressure to the valve guide or bearing and provides spiral grooves on the stem of the valve for distributing the lubricant along the surface of the valve stem. Patent 2,722,925 solves the problem of lubricating the valve stem by providing a valve guide which defines a longitudinal annular recess for containing a quantity of oil that is distributed along the valve stem as a consequence of its reciprocation. This patent also teaches the formation of a carbon ring by the carbonization of oil distributed along the valve stem with the carbon ring being effective to prevent distribution of oil to the exhaust manifold of the engine.

The above patents are lacking in providing a sealing arrangement which prevents the entrance of exhaust gases between the valve stem and the guide which is considered by those skilled in the art to be the major cause of sticking valves.

In its broadest aspects, this invention includes a valve guide bushing having means associated therewith for communicating lubricating oil intermediate the ends of the valve stem for assisting in distributing the oil throughout its length, means for reducing the heat transferred to the valve guide bushing, and means providing a seal at one end of the valve guide which is adjacent the exhaust manifold of the engine for sealing the valve stem from the exhaust gases of the engine.

Accordingly, it is an object of this invention to provide a new and improved valve lubricating and sealing device.

It is another object of this invention to form the valve guide bushing with a heat barrier for reducing conduction heat transfer to the valve guide.

It is another object of this invention to incorporate lubricating oil distribution passageways in a valve guide member and a sealing arrangement which is effective to preclude the entrance of exhaust gases between the valve stem and guide.

These and other objects of the invention will become more apparent upon consideration of the following detailed description thereof taken in conjunction with the accompanying drawings in which:

FIG. 1 is a longitudinal section of a valve and its guide in assembled relation with a fragmentary portion of an internal combustion engine head.

FIG. 2 is a modification illustrating a simplified construction of the lubricating arrangement.

With reference to the drawings, the valve lubricating and sealing arrangement according to this invention is shown to be operatively associated with a fragmentary portion of an internal combustion engine head 10, the lower end of which is formed to define an exhaust gas manifold 12 being provided for conducting the exhaust gases from the combustion chamber of the engine. The inlet port of the manifold 12 has a valve seat 14 against which the head 16 of a conventional poppet valve 18 intermittently engages in time relation to the engine cycle. The head 10 is formed with a bore 20 through which the valve stem 22 extends to a point upwardly beyond the surface 24 of the head 10.

The valve is guided for axial reciprocation in the bore 20 by a pair of interfitting tubular sleeves 26 and 28 with the sleeve 28 constituting the valve guide bushing. The sleeve 26 is press fitted into the bore 20 and is formed, at the lower end thereof adjacent the manifold 12, with an annularly enlarged portion 30, and its upper end extending upwardly adjacent the surface 24, is flared to provide a well 32 serving to accumulate lubricant therein.

The interior surface of the sleeve 26 is formed with a generally conical transition surface 34 extending from the main body which is of larger diameter to the annularly thickened portion 30. A seal 36 is also formed with a conical surface corresponding to the conical surface 34 and is preferably made of Pyrotex material consisting of asbestos fibres, graphite and matrix of Bakelite.

An annular groove 38 preferably semi-circular in cross-section is formed on the outer periphery of the sleeve 26 and relatively close adjacency to the manifold 12. This groove 38 is incorporated to provide a heat barrier for reducing heat transferred to the sleeve 26 by conduction, thus decreasing the temperature of the valve stem 22.

The sleeve 28 is slidably fitted within the sleeve 26 and has its lower end in abutting engagement with the seal 36. The sleeve 28 is formed with a radially extending shoulder 40 which supports a valve rotator ring 42. An elongated slot 44, extending from the shoulder 40 to a radial hole 46, is formed on the outer surface of the sleeve 28 in order to establish a channel for communicating the oil in the well 32 to the bore of the sleeve 28. Distribution of the lubricating oil substantially the entire length of the stem 22 is positively insured by providing a plurality of circumferential longitudinally spaced grooves 48 which pump the oil out of the valve guide. These grooves may also take the form of spiral grooves as shown in U.S. Patent 2,069,745, previously referred to.

The upper end of the valve is formed with a conical portion 50 surrounded by a split conical ring 52 which is received in an annular plate 54, thus constituting a connection for holding the annular plate in the position illustrated in the drawings. A conventional helical spring 56 is held under compression between the plate 54 and the valve rotator 42 for urging the valve head 16 against the seat 14 and for biasing the sleeve 28 downwardly against the seal 36.

The significant relationship of the structure described above pertains to the location of the seal 36 relative to the exhaust manifold 12. By locating the seal at the end of the sleeve 28, entrance of exhaust gases upwardly along the valve stem 22 is precluded thus carbonization of the lubricating oil between the bearing surfaces of the valve stem and the sleeve 28 is prevented.

The modifications shown in FIG. 2 are functionally identical to the construction of FIG. 1 but it represents a structurally simpler correlation of structure. In this construction head 10a is provided with a stepped bore 20a within which is inserted a valve guide bushing 28a. A counterbore 58 extending radially outwardly from the bore 20a is provided on the upper surface of the head 10a and serves as a well for collecting lubricating oil. The bushing 28a also includes a longitudinal groove 44a extending from a radial shoulder 40a to a transverse hole 46a formed through the wall of the bushing 28a. Circumferential grooves 48a serve to distribute the lubricating oil along the stem 22a. In this embodiment a corresponding seal 36a is seated in the bore 20a to establish sealing relationship with the surface of the valve stem 22a and is effective to block the entrance of exhaust gases into the bore of the bushing 28a.

It is to be noted that the construction of the modification shown in FIG. 2 does not include the tubular sleeve 26 which is formed with the well 32. However, the counterbore 58 fulfills the same function of collecting lubricating oil for distribution to the elongated groove 44a, thus effecting the distribution of lubricating oil to the valve stem 22a.

In a similar manner as heretofore described, the spring 56a is held under compression between the annular plate 54a and the valve rotator 42a forcing the bushing 28a downwardly and in turn pressing the seal 36a against the valve stem 22a.

The seals 36 and 36a can be made of Pyrotex material which includes asbestos fibres, graphite and matrix of Bakelite. It has been found, however, that a seal made of this material should be formed so that the axial length of the interior surface which contacts the surface of the valve stem be within .100 to .150 of an inch to insure, at the lower limit, a sufficient contact surface to preclude infiltration of exhaust gases, and to insure at the higher limit, a value of frictional drag which would not interfere with the opening and closing of the valve. In addition to these factors the unit pressure of the seal against the valve stem must fall within predetermined limits to achieve seal effectiveness. It should be apparent, however, that the seal 36 or 36a may be made of other materials which would impose more or less frictional drag and accordingly each material would dictate different ranges of contact area between the seal and valve stem. For example, assuming Teflon would be a suitable material for the seal, the contact area may possibly be greater since the coefficient of friction of Teflon and a metal surface may be less than the specified Pyrotex material.

Accordingly, a valve guide bushing constructed in accordance with the principles of this invention would provide means for accumulating lubricating oil to be distributed to the valve stem which comprises the wells 32 and 58, means for communicating the accumulated oil to the stem consisting of longitudinal grooves 44 and 44a and the radial holes 46 and 46a. This invention also includes means, such as the seals 36 and 36a, located adjacent the exhaust manifold of the engine which prevent the entrance of exhaust gases into the valve guide bushing thus precluding carbonization and consequent sticking of the valve.

I claim:

1. An apparatus for sealing and lubricating an internal combustion engine including a valve of the type having an elongated cylindrical valve stem and a radially enlarged head comprising an elongated tubular sleeve forceably fitted in an opening formed in the engine, such sleeve having one end formed to define an annular well for accumulating lubricating oil and the other end having an annular groove for reducing the amount of heat transferred to said sleeve, an elongated bearing slidably fitted within said sleeve and being adapted to reciprocably receive the stem of said valve, a longitudinal groove formed on the outer surface of said bearing and extending from said annular well to a transverse hole formed in the wall of said bearing, said groove and said bore defining a flow path for the lubricating oil so that communication between the interior of said bearing and said annular well of said sleeve is established, and means captively retained by said sleeve and said bearing for sealing the interior surface of said bearing from the exhaust manifold of the engine.

2. An improved guide assembly including a valve, having a stem, head, valve spring and valve spring retaining members in combination with an internal combustion engine valve passage comprising:

an elongated valve guide means for reciprocally supporting the valve stem of said valve, said valve guide means slidably inserted in a stepped bore in an internal combustion engine;

sealing means supported adjacent said valve passage between the walls of said stepped bore and the inserted end of said elongated valve guide means for compression therebetween whereby said sealing means is forced into sealing engagement with the surface of said valve stem; and a valve spring supporting means on said protruding end of said elongated valve guide means for supporting said valve spring under compression between said supporting means and said spring retaining members associated with the end of said valve stem whereby said elongated valve guide means is urged against said sealing means by said valve spring to insure sealing engagement of said sealing means with said valve stem.

3. The improved valve guide assembly defined in claim 2 wherein the sealing means is a Pyrotex composition which circumferentially engages the surface of said valve stem in a ring having a thickness from .100 to .150 of an inch.

4. The improved valve guide assembly defined in claim 2 wherein the elongated valve guide means includes an oil passage from its protruding end to the central portion of the valve stem for lubricating said valve stem.

5. The improved valve guide assembly defined in claim 4 wherein the oil passage means is connected to a lubricating oil reservoir located adjacent to the protruding end of the elongated valve guide means.

6. The improved valve guide assembly defined in claim 5 wherein the oil passage means includes a groove on the outside surface of the elongated valve guide means and apertures therefrom to the inside surface of said elongated valve guide means in the central portion thereof.

7. The improved valve guide assembly as defined in claim 5 wherein the valve stem has at least one oil distributing passage therein.

8. The improved valve guide assembly defined in claim 2 wherein a press fitted sleeve is inserted in the engine and forms said stepped bore and the elongated valve guide means is slidably received therein and the sealing means is supported between the inner walls of said sleeve and the inserted end of said elongated valve guide means for compression therebetween.

9. The improved valve guide means defined in claim 2 wherein the elongated valve guide means is a unitary cylindrical structure.

10. The improved valve guide means defined in claim 2 wherein the lower walls of the stepped bore are conical whereby the sealing means are wedged toward the valve stem by the downward thrust of the elongated valve guide means.

References Cited by the Examiner

UNITED STATES PATENTS

| | | |
|---|---|---|
| 1,281,246 | 10/1918 | Sturtevant. |
| 1,312,730 | 8/1919 | Horn _____ 123—188 |
| 1,356,914 | 10/1920 | Fekete _____ 123—90 |
| 1,569,455 | 1/1926 | Burwell _____ 123—188 |
| 1,594,517 | 8/1926 | Dufty _____ 123—188 |
| 1,714,954 | 5/1929 | Hanson et al. |
| 1,918,481 | 7/1933 | Moorhouse _____ 123—188 |
| 2,069,745 | 2/1937 | Allen _____ 184—6 |
| 2,716,972 | 9/1955 | Farny et al. _____ 123—188 X |
| 2,917,036 | 12/1959 | Alexandroff _____ 123—188 |

FOREIGN PATENTS

| | | |
|---|---|---|
| 1,042,291 | 10/1958 | Germany. |
| 866,665 | 4/1961 | Great Britain. |
| 495,410 | 6/1954 | Italy. |

MARK NEWMAN, *Primary Examiner.*

AL LAWRENCE SMITH, *Examiner.*